Patented Oct. 10, 1922.

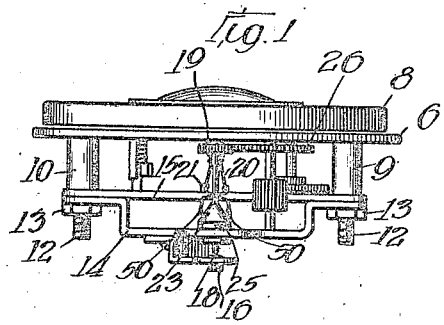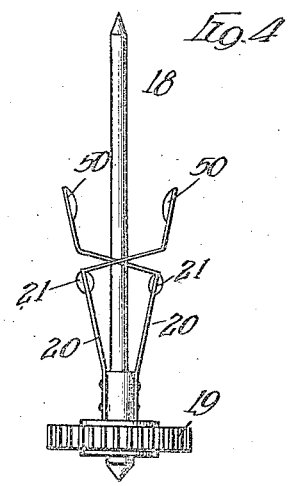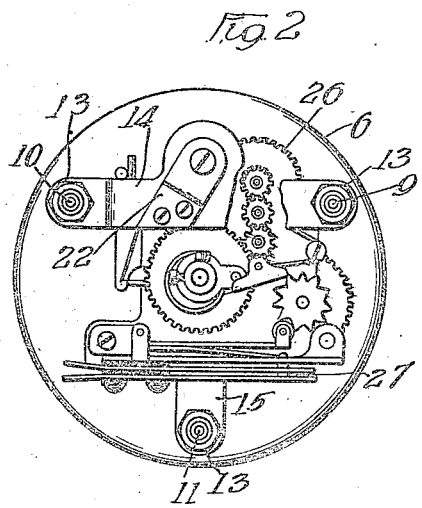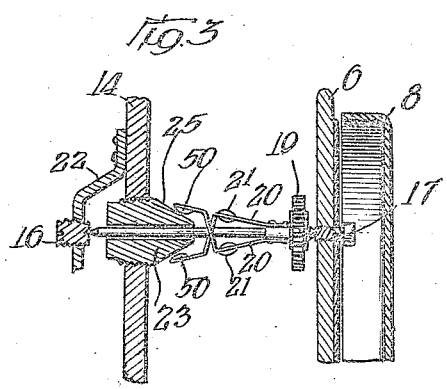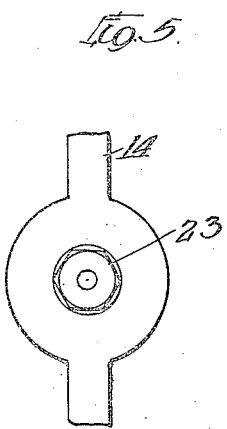

1,431,379

UNITED STATES PATENT OFFICE.

WILLIAM W. DEAN, OF WILMETTE, ILLINOIS.

CENTRIFUGAL GOVERNING MECHANISM.

Application filed October 1, 1919. Serial No. 327,817.

*To all whom it may concern:*

Be it known that I, WILLIAM W. DEAN, a citizen of the United States, a resident of Wilmette, in the county of Cook and State of Illinois, have invented certain new and useful Improvements in Centrifugal Governing Mechanism, of which the following is a full, clear, concise, and exact description.

This invention relates to centrifugal governing mechanisms, for use particularly in connection with impulse transmitting mechanisms for automatic telephone exchanges, although the use of my invention is not limited thereto but is capable of wide and extensive use in many other kinds of mechanisms.

A principal object of my invention is to provide a new and improved device of this character, having few and simple parts, and which parts are so constructed and disposed that they may be readily inspected and adjusted, without the necessity of dissembling the different parts of the governor or the mechanism of which the governor forms a part.

It is another object of my invention to provide a governor wherein flexible springs, ends of which are attached to a rotatable member of the mechanism and disposed at an angle to the plane of rotation of the said member, and deflected by the power of the centrifugal force to cause their ends to engage a tapered end of an adjustable machine screw. The pressure of contact between the contact ends of the springs, and the tapered surface of the machine screw ends depends in the device of my invention upon the speed of rotation of the said mechanism's rotatable member.

It is a further object of my invention to provide in such a device having flexible springs carried by a rotatable member an adjustable screw having a tapered end to form a frictional contact surface which may be engaged with varying contact pressures, by the contact ends of the rotating springs to preferably provide a pole through the said screw, in the direction of its length, of sufficient diameter to clear an extension of a rotatable shaft, upon which the said spring members are carried so that the said shaft may be pivoted at one end at a point beyond the head of the said machine screw and at the other end at a point beyond the point of support of the said flexible springs.

It is a further object of my invention to provide flexible contact springs wherein the movement of the spring contact ends upon speed accelerations, is in a direction toward the axis of rotation. By this construction, the ends of the springs, and the springs themselves, may be more readily made visible from the outside of the device in which the governor is placed for the purpose of inspection, replacement and adjustment.

It is another object of my invention to provide spring governor contact springs, having a flexible spring portion, provided between the contact portions of the springs, and the weights carried by the springs whereby more even frictional pressure is had between the spring carried contacts and the stationary cooperating surface, in this case, the surface of the tapered end of the machine screw.

It is still a further object of my invention, to make the tapered machine screw, hollow, for the passage of the rotatable shaft, at the same time providing the screw with a head, which may be engaged by a wrench or other tool which may engage the screw head and thereby be adapted to turn the screw, the said hollow being threaded into a portion of the frame of the mechanism so that a so called "micrometer" longitudinal adjustment of the tapered surface may readily be had. Other objects of my invention, and the invention itself will be apparent from the description of the same, following, in which description, reference will be had to the accompanying drawings, and in which drawings like reference characters denote like parts, and in which:—

Fig. 1 shows a side view of an automatic telephone exchange impulse mechanism, commonly known in the art as a "dial," in which dial an embodiment of the governor of my invention is placed to co-operate with the other working parts of the said dial.

Fig. 2 shows a rear view of the said dial in which the governor of my invention is placed, this view as well as the view of the foregoing figure, showing many other exposed working parts of the dial.

Fig. 3 shows a cross-sectional view of portions of the dial. In this figure, the governor and certain associated parts are chiefly illustrated, being mostly illustrated in section, although a side view of certain of the parts is shown as is apparent.

Fig. 4 shows a side view of the rotatable portion of the spring governor of my invention, comprising a shaft, centrifugal springs, and a gear pinion.

Fig. 5 shows a rear end view of some of the parts illustrated at Fig. 3. In this view an annular ring with its hexagon head is clearly shown, and the ends of the centrifugal spring members are also shown.

Referring now to the different figures, at 6, is shown the dial plate mounted in the front of the impulse transmitter, and in front of which, mounted on a shaft, 7, is shown a finger hole plate 8. The dial plate 6, forms the front wall of the dial mechanism to which the other working parts thereof are secured. Rigidly secured to this front dial plate 6, are three supporting posts 9, 10 and 11, each of which has a threaded end 12, of reduced cross section. Clamping nuts 13, securely clamp to the end of these posts the frame members 14 and 15 between which, and the front dial plate 6, most of the working parts of the impulse transmitting dial are mounted.

Such of the various parts of the transmitting dial, as form no part of the present invention will not be herein described in detail, such reference only being had to these parts as may be necessary to describe the present invention. The dial mechanism outside of the governor is well known in the art and needs no detailed description.

The dial proper, comprises a pair of pivot screws 16 and 17, between which a rotatable rod 18, is carried, the ends of the said screws forming bearings for the said rod, the said rod carrying a pinion 19, and a pair of leaf-spring members 20. Each of the spring members 20, carry at their mid portions, weights 21. The pivot screw 16 is carried by a support 22, which is rigidly secured to the frame member 14, and the pivot screw 17, is carried by the dial front plate 6. The frame member 14, has a circular hole, the wall of which is threaded, which admits the threaded hollow screw 23, which is longitudinally adjustable by co-operation of the said threads. The annular hollow screw or ring, 23, has a hexagon head, and a tapered end 25, the direction of inclination of the said tapered end being towards the axis of rotation of the rod 18, and towards the point of support of the spring member 20, and which point of support is adjacent to the pinion 19.

In the operation of the dial mechanism, the function of the centrifugal governor which is geared to the other operating parts of the dial mechanism by the engagement of pinion 19, with a larger pinion 26 of the said mechanism, is to retard the speed of rotation of the said pinion 26 and thereby retard the speed at which the controlling interrupter contacts 27, are operated. The dial mechanism illustrated, is set for operation by a preliminary rotative movement of the finger plate 8, the said finger plate then returning to normal position under the propelling influence of a retractile spring, which forces the finger plate 8, back to normal position, the mechanism during the returning movement of the dial simultaneously operating the interrupting contacts 27, to control an electric circuit in which these contacts are included, and the speed at which the mechanism is operated on the return of the finger plate to normal, being determined by the degree of frictional contact had by the friction pads 50, on the springs 20, the friction pads 50 are placed on inside surfaces of the ends of the springs, and when the governor weights 21 tend to fly outwardly by the power of centrifugal force when the device is operated, the friction pads 50 which are carried on the same springs, but on the opposite side of the shaft will press against the inclined outer wall of the tapered machine screw. The construction of these springs is as shown in Figs. 1, 3 and 4, most clearly, such that when the weights move outwardly, from the axis of shaft rotation the friction pads, carried on extensions of the springs but on the opposite side of the said axis move inwardly against the outer wall of the tapered end of the screw.

By providing the machine screw with a longitudinal adjustment the tapered end of the screw is capable of being adjusted nearer to or from the said frictional pads, and the degree of frictional pads and the tapered wall of the machine screw and may be varied over a considerable range, so that the governor will have a varying degree of retarding effect upon the speed of operation on the interrupting contacts as may be desired.

It is of considerable importance in governors of this kind, to be able to view the flexible springs, and the stationary friction wall surface, so that the friction contact portion may be properly adjusted, the spring 20, being bent if necessary, so that both spring ends, which in the device of my invention, carry the friction pads 50 will normally stand equi-distance to the stationary friction surface, which in this case is the surface 25, of the tapered end of the machine screw 23.

In the improved mechanism of my invention, not only may the stationary friction surface be readily viewed without disassembling any of the mechanism, but it may also be adjusted to and from the contact ends of the centrifugal springs and also a good view may be had of the other co-operating parts comprising the flexible springs 20, and their carried weights 21.

Having thus described a preferred em- bodiment of my invention, I am aware that numerous and extensive departures may be made from the said embodiment herein illustrated and described, but without departing from the spirit of my invention, which resides in the structure defined in the following claims:—

1. In a spring governor the combination with a spring, a rotatable shaft, one end of the said spring being carried by the said shaft, the other end being adapted to be deflected by centrifugal force when the said shaft is rotated, a machine screw having a tapered end, said member being mounted so that its tapered end wall may be engaged by the end of the said spring when the said spring is deflected by the power of the centrifugal force, the said wall being inclined toward the axis of rotation of the said shaft and toward the point of support of the said spring.

2. In a spring governor, the combination with a rotatable shaft, a centrifugal contact member carried by the said shaft and adapted to be revolved about the axis of rotation of said shaft when the said shaft is rotated, yielding means supporting the said contact member on the said shaft, a ring disposed about the axis of the said shaft, said ring having an outside wall adapted to be engaged by the said contact member when the said shaft is rotated, the said wall being of larger diameter on one edge, than on its other edge.

3. In a speed controlled mechanism, the combination with a centrifugal governor, a rotatable shaft therefor, means to rotate said shaft, a spring secured to the shaft a contact member supported on the said spring and adapted to be thrown inwardly when the said shaft is rotated, a machine screw so disposed that its axis coincides with the axis of shaft rotation, said screw having a tapered end to form an outside wall of gradually decreasing diameter, said wall being adapted to be engaged by the said contact member, and means to longitudinally adjust the position of the said screw in the direction of its axis.

4. In a spring governor the combination with a spring, a rotatable shaft, one end of the said spring being secured to the said shaft, the other end being adapted to be deflected by centrifugal force when the said shaft is rotated, a hollow machine screw, said screw being mounted so that a portion of its outer wall may be engaged by the end of the said spring when the said spring is deflected by the power of the centrifugal force, the said portion being inclined toward the axis of rotation of the said shaft, and toward the point of support of the said spring, a frame, and a perforation in the said frame, said perforation having an inside threaded surface an outside thread for the said screw, said screw being adapted to be placed in the said perforation and longitudinally adjusted along the axis of rotation of the said shaft by rotating the said screw in the said threaded hole.

5. In a spring governor, the combination with a rotatable shaft, a centrifugal contact member carried by the said shaft and adapted to be revolved about the axis of rotation of said shaft when the said shaft is rotated, yielding means supporting the said contact member on the said shaft, a ring disposed about the axis of rotation of the said shaft, said ring having an outside wall adapted to be engaged by the said contact member when the said shaft is rotated, the said wall being of larger diameter on one edge, than on its other edge, a frame, and a perforation in the said frame, said perforation having an inside threaded surface, an outside thread for the said ring, said ring being adapted to be placed in the said perforation and longitudinally adjusted along the axis of rotation of said shaft by rotating the said ring in the said threaded hole.

6. In a spring governor, the combination with a rotatable shaft, a stationary contact disposed about the axis of rotation of the said shaft, and having an outer friction surface, a flexible leaf spring, a weight for the said spring carried at an intermediate point on the said spring, said spring being secured at one end of the said rotatable shaft, and having a free stationary contact engaging end disposed on the opposite side of the said shaft from the said carried weight.

7. In a spring governor, the combination with a rotatable shaft, a stationary contact disposed about the axis of rotation of the said shaft, and having an outer tapered friction surface, a flexible leaf spring, a weight for the said spring carried at an intermediate point on the said spring, said spring being secured at one end of the said rotatable shaft, and having a free stationary contact engaging end disposed on the opposite side of the said shaft from the said carried weight.

8. In a spring governor, the combination with a rotatable shaft, a flexible spring secured at one end to the shaft, said spring being angularly disposed to the said shaft, but closely adjacent thereto, a stationary contact adapted to be engaged by the other end of the said spring when the said shaft is rotated, and a weight secured by the said spring intermediate of its ends.

9. In a spring governor, the combination with a rotatable shaft, a flexible spring secured at one end to the said shaft, and extending outwardly therefrom angularly with respect to the axis of the said shaft, but relatively close thereto, a stationary contact adapted to be engaged by the other end of the said spring when the said shaft is rotated, and a weight secured by the said spring intermediate of its ends, said weight being disposed on one side of the said shaft, and the said free end of the spring being disposed on the other side of the said shaft.

10. In a spring governor, a rotatable shaft, a stationary cone member longitudinally adjustable, a flexible spring attached at one end to the said shaft, and having its other end normally lying adjacent to the tapered wall of the said cone and adapted for frictional contact therewith when the said shaft is rotated, the said spring being weighted intermediate of its ends on one side of the said shaft, the said other contacting end of the spring being disposed on the other side of the said shaft.

11. In a spring governor, a rotatable shaft, a stationary cone member longitudinally adjustable, a flexible spring attached at one end to the said shaft, and having its other end normally lying adjacent to the tapered wall of the said cone and adapted for frictional contact therewith when the said shaft is rotated, the said spring being weighted intermediate of its ends on one side of the said shaft, the said other contacting end of the spring being disposed on the other side of the said shaft, the said spring being resilient between each of its ends and the said carried weight.

12. In a spring governor, the combination with a rotatable shaft of a cone shaped stationary contact, said cone contact being perforated to admit the said shaft, a spring secured to the said shaft at one end, and having its other end disposed adjacent the tapered end of the said cone, the said spring being respectively weighted intermediate of its ends, the weighted portion and the free end of the spring being disposed on the opposite sides of the said shaft.

13. In a spring governor the combination with a spring, a rotatable shaft, one end of the said spring being secured to the said shaft, the other end being adapted to be deflected by centrifugal force when the said shaft is rotated, a stationary contact member having a tapered end, said member being mounted so that its tapered wall may be directly engaged by the end of the said spring when the said spring is deflected by the power of the centrifugal force, the said wall being inclined toward the axis of rotation of the said shaft and toward the point of support of the said spring.

In witness whereof, I hereunto subscribe my name this 25 day of Sept. A. D. 1919.

WILLIAM W. DEAN.